United States Patent
Lee

(10) Patent No.: US 8,887,590 B2
(45) Date of Patent: Nov. 18, 2014

(54) AUTOMATIC CLEARANCE COMPENSATION DEVICE FOR SUPPORT YOKE OF RACK-PINION TYPE STEERING APPARATUS

(75) Inventor: Seung Jin Lee, Wonju-si (KR)

(73) Assignee: Mando Corporation, Gyeonggi-Do (KR)

( * ) Notice: Subject to any disclaimer, the term of this patent is extended or adjusted under 35 U.S.C. 154(b) by 761 days.

(21) Appl. No.: 13/109,362

(22) Filed: May 17, 2011

(65) Prior Publication Data

US 2011/0303044 A1 Dec. 15, 2011

(30) Foreign Application Priority Data

Jun. 15, 2010 (KR) ........................ 10-2010-0056518

(51) Int. Cl.
*F16H 35/00* (2006.01)
*F16H 55/28* (2006.01)
*B62D 3/12* (2006.01)

(52) U.S. Cl.
CPC .............. *B62D 3/123* (2013.01); *F16H 55/283* (2013.01)
USPC ............................ 74/388 PS; 74/422; 74/409

(58) Field of Classification Search
CPC .......... B62D 3/12; B62D 3/123; B62D 3/126; B62D 5/0409; B62D 5/22; F16H 55/283; F16H 57/12; F16H 55/18; F16H 55/26; F16H 55/286; F16H 55/288; F16H 19/04
USPC ...... 74/109, 388 PS, 409, 422, 498; 280/427, 280/428, 443, 444; 384/18, 19, 44, 49, 50, 384/58
See application file for complete search history.

(56) References Cited

U.S. PATENT DOCUMENTS

| | | | | |
|---|---|---|---|---|
| 5,931,046 A | * | 8/1999 | Phillips | 74/422 |
| 7,243,994 B2 | * | 7/2007 | Cha | 297/362 |
| 7,458,291 B2 | * | 12/2008 | Douma et al. | 74/388 PS |
| 7,487,984 B1 | * | 2/2009 | Lemont et al. | 280/93.514 |
| 7,574,944 B2 | * | 8/2009 | Yang | 74/567 |
| 7,631,571 B2 | * | 12/2009 | Douma et al. | 74/422 |
| 7,654,166 B2 | * | 2/2010 | Heo | 74/409 |
| 8,327,731 B2 | * | 12/2012 | Sung et al. | 74/422 |
| 2003/0173182 A1 | * | 9/2003 | Kim | 192/223.2 |
| 2007/0209463 A1 | * | 9/2007 | Song et al. | 74/388 PS |
| 2008/0202271 A1 | * | 8/2008 | Heo | 74/422 |
| 2010/0056317 A1 | * | 3/2010 | Kirubaharan | 475/175 |
| 2010/0122595 A1 | * | 5/2010 | Sung et al. | 74/409 |
| 2011/0303044 A1 | * | 12/2011 | Lee | 74/492 |

* cited by examiner

*Primary Examiner* — Troy Chambers
*Assistant Examiner* — Alexander Vu
(74) *Attorney, Agent, or Firm* — McDermott Will & Emery LLP

(57) ABSTRACT

An automatic clearance compensation device for a support yoke of a rack-pinion type steering apparatus, includes: a hollow yoke cylinder integrally formed with a rack housing, wherein the yoke cylinder is positioned at the opposite side of a rack gear formed at a rack bar; a support yoke slidably inserted within the yoke cylinder and formed with a groove at its one side to be in contact with the outer surface of the rack bar; a spacer assembly installed within the yoke cylinder, contacting the other side of the support yoke. The device can automatically compensate for the clearance created due to the wear between the rack bar and the support yoke. Even when the external impacts are reversely transmitted, the device can remove the noise generated between the support yoke and the yoke plug.

8 Claims, 4 Drawing Sheets

AUTOMATIC CLEARANCE COMPENSATION DEVICE FOR SUPPORT YOKE OF RACK-PINION TYPE STEERING APPARATUS

CROSS-REFERENCE TO RELATED APPLICATION

This application claims priority from and the benefit under 35 U.S.C. §19(a) of Korean Patent Application No. 10-2010-0056518, filed on Jun. 15, 2010, which is hereby incorporated by reference for all purposes as if fully set forth herein.

BACKGROUND OF THE INVENTION

1. Field of the Invention

The present invention relates to an automatic clearance compensation device for a support yoke of a rack-pinion type steering apparatus, and more particularly to an automatic clearance compensation device for a support yoke of a rack-pinion type steering apparatus which can automatically compensate for a clearance generated at the support yoke due to a long-term use of the rack-pinion type steering apparatus without a separate adjusting work.

2. Description of the Prior Art

In general, a steering apparatus refers to a device to change the travelling direction of a vehicle according to a driver's intent. The steering device is an auxiliary device to change a rotational center about which a front wheel is pivoted so as to move the vehicle in a direction where the driver wants to go.

FIG. 1 is a schematic view illustrating a conventional rack-pinion type steering apparatus of a vehicle, and FIG. 2 is a side elevation cross-sectional view illustrating a gearbox provided in the conventional rack-pinion type steering apparatus.

Referring to FIG. 1, a rack-pinion type steering apparatus of the vehicle includes a steering wheel 100 disposed at a driver's seat, a steering shaft 105 connected to the steering wheel 100, a steering column 103 to secure the steering shaft 105 to a vehicle body (not shown), a gearbox 130 having a rack gear 110 and a pinion gear 120 to convert a rotational force inputted from the steering shaft 105 into a linear movement, a rack bar 140 provided with inner ball joints 145 at its opposite ends, a tie rod 150 integrally formed with a ball of the inner ball joint 145, and outer ball joints 155 provided at the end of the tie rod 150. The tie rod 150 is connected with a knuckle 165 of a tire 160 through the outer ball joints 155. A reference numeral 170 denotes a rack housing to accommodate the rack bar 140.

As shown in FIG. 2, the gearbox 130 provided in the conventional rack-pinion type steering apparatus includes a pinion shaft 220, a rack bar 140, a support yoke 230, a spring 235, a yoke plug 240, and a rack housing 170. This gearbox 130, as described above, converts a rotational force inputted from the steering shaft 105 (see FIG. 1) into a linear movement.

The pinion shaft 220 receives a rotational force from an input shaft 210 connected with the steering shaft 105 and delivers the same to the rack bar 140. Here, the pinion shaft 220 is connected to the input shaft 210 through a torsion bar 215. Formed on the distal end of the pinion shaft 220 is a pinion gear 120 to be engaged with a rack gear 110 (see FIG. 1) of the rack bar 140.

The rack bar 140, cooperating with the pinion shaft 220, is designed to convert a rotational movement into a linear movement. The rack bar 140 is shaped like a bar to traverse to the front wheels of the vehicle. The rack bar 140 is formed with a rack gear 110 on one side of the opposite inner ball joints 145, wherein the rack gear 110 is engaged with the pinion gear 120 of the pinion shaft 220.

Meanwhile, the support yoke 230 is designed to reduce a clearance between the rack bar 140 and the pinion shaft 220, so as to smoothly deliver the power. The support yoke 230 is positioned at the rear side of the rack bar 140, i.e., an opposite side of the surface on which the rack gear 110 is formed. The support yoke 230 has a structure displaceable back and forth, while inserted in the rack housing 170 formed in a cylinder shape.

The support yoke 230 is shaped like a cylinder capable of slidably moving back and forth within the cylinder of the rack housing 170, and the front portion of the rack bar 140 is formed in a semi-circular groove to be closely in contact with the rear surface of the rack bar 140.

The front portion of the support yoke 230 as such experiences a sliding friction with the rear surface of the rack bar 140. In order to prevent wear and noise of the rack bar 140 due to such a friction, the support yoke 230 is generally made from a plastic or other much softer material than that of the rack bar 140.

To enable the rack bar 140 to be closely brought into contact with the pinion shaft 220 and deliver the power efficiently, a spring 235 is disposed at the rear side of the support yoke 230. The spring 235 pushes the support yoke 230 with a constant pressure, so that the support yoke 230 can closely make contact with the rack bar 140 to compensate for the clearance created between the rack bar 140 and the pinion shaft 220. A coil spring is commonly used for the spring 235, which is supported by a yoke plug 240.

The yoke plug 240 supports the spring 235 to apply a resilient force to the support yoke 230. The yoke plug 240 is generally formed with a male screw portion which can be engaged with the rack housing 170 formed with a female screw portion. The yoke plug 240 is provided with a recess (not shown) on its rear surface in which a wrench can be inserted. Hence, when the yoke plug 240 is coupled to the rack housing 170 or when a severe clearance is created between the rack bar 140 and the pinion shaft 220, the tensional force of the spring 235 is adjustable by tightening the yoke plug 240 with a wrench.

However, it should be noted that due to a long-term use of the steering apparatus, the support yoke 230 gradually moves towards the rack bar 140, which increases the clearance between the yoke plug 240 and the support yoke 230, thereby producing a large noise because of vibrations therebetween.

Besides, it should be appreciated that even though there is no increase in the clearance, the rack bar 140 moves instantly due to external impacts reversely transmitted from the tire 160 (see FIG. 1) when the vehicle travels on irregular road surfaces, such that the support yoke 230 is collided with the yoke plug 240 to cause noise.

SUMMARY OF THE INVENTION

Accordingly, the present invention has been made to solve the above-mentioned problems occurring in the prior art, and an object of the present invention is to provide an automatic clearance compensation device for a support yoke of a rack-pinion type steering apparatus capable of automatically compensating a clearance, without a separate adjusting work, which is created due to the wear of a support yoke provided at the rack-pinion type steering apparatus using a spacer assembly including an axial elastic member, a radial elastic member, and a plurality of spacers to be cooperated with these elastic members.

In order to accomplish this object, there is provided an automatic clearance compensation device for a support yoke of a rack-pinion type steering apparatus, including: a hollow yoke cylinder integrally formed with a rack housing, wherein the yoke cylinder is positioned at the opposite side of a rack gear formed at a rack bar; a support yoke slidably inserted within the yoke cylinder and formed with a groove at its one side to be in contact with the outer surface of the rack bar; a spacer assembly installed within the yoke cylinder, contacting the other side of the support yoke, wherein the spacer assembly is expandable and retractable in axial and radial directions; and a yoke plug coupled at the end of the yoke cylinder for supporting the spacer assembly.

Further, in accordance with another aspect of the present invention, there is provided an automatic clearance compensation device for a support yoke of a rack-pinion type steering apparatus, wherein the spacer assembly includes: a first spacer provided with a protrusion extending at a right angle from a center of its one side surface and two or more guide grooves which are radially obliquely formed with respect to the protrusion; a second spacer provided with a penetration hole formed at the center of its one side surface and two or more guide grooves which are radially obliquely formed with respect to the penetration hole; two or more wedge members disposed between the guide grooves forming pairs when the respective guide grooves of the first and second spacers are correspondingly positioned facing each other to form pairs; at least one axial elastic member disposed in an axial direction between the first and second spacers; and a radial elastic member for enclosing and connecting the radial outer surfaces of the wedge members when the wedge members are radially disposed between the first and second spacers.

As described in the above, the present invention has effects in that the clearance created due to the wear between the rack bar and the support yoke can be automatically compensated, and that even when the external impacts are reversely transmitted, the noise generated between the support yoke and the yoke plug can be eliminated.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Figure 1:
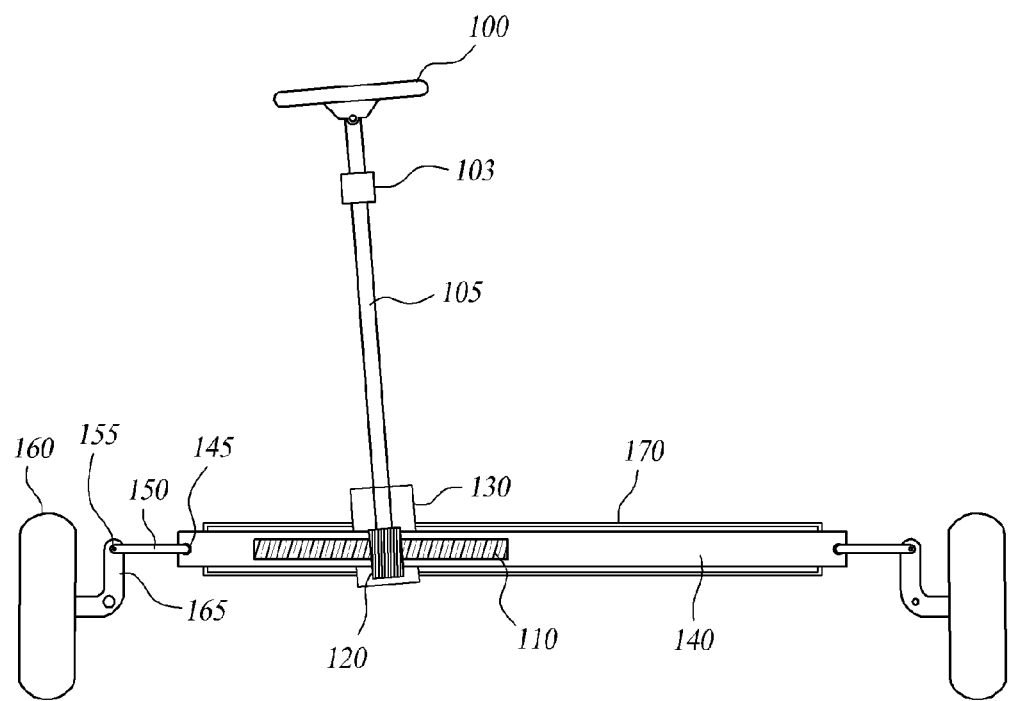
FIG. 1 is a schematic view illustrating a conventional rack-pinion type steering apparatus of a vehicle.
Figure 2:
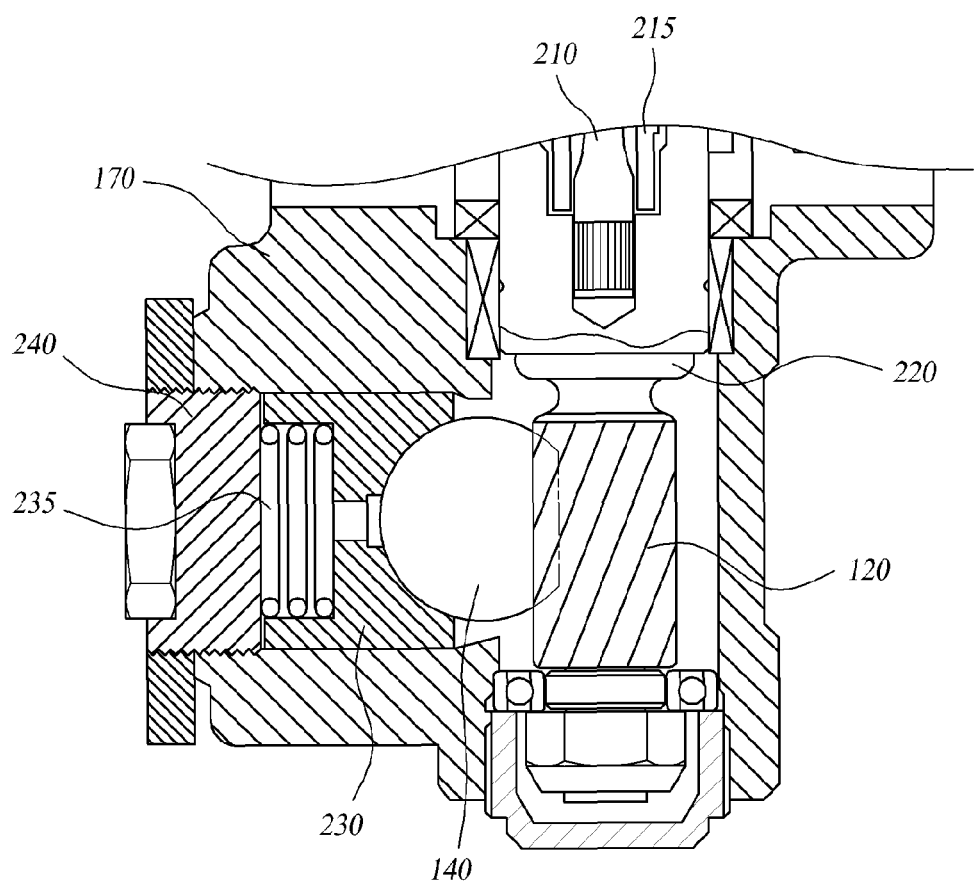
FIG. 2 is a side elevation cross-sectional view illustrating a gearbox provided in the conventional rack-pinion type steering apparatus.

Hereinafter, exemplary embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

In addition, terms, such as first, second, A, B, (a), (b) or the like may be used herein when describing components of the present invention. Each of these terminologies is not used to define an essence, order or sequence of a corresponding component but used merely to distinguish the corresponding component from other component(s). It should be noted that if it is described in the specification that one component is "connected," "coupled" or "joined" to another component, a third component may be "connected," "coupled," and "joined" between the first and second components, although the first component may be directly connected, coupled or joined to the second component.

Figure 3:
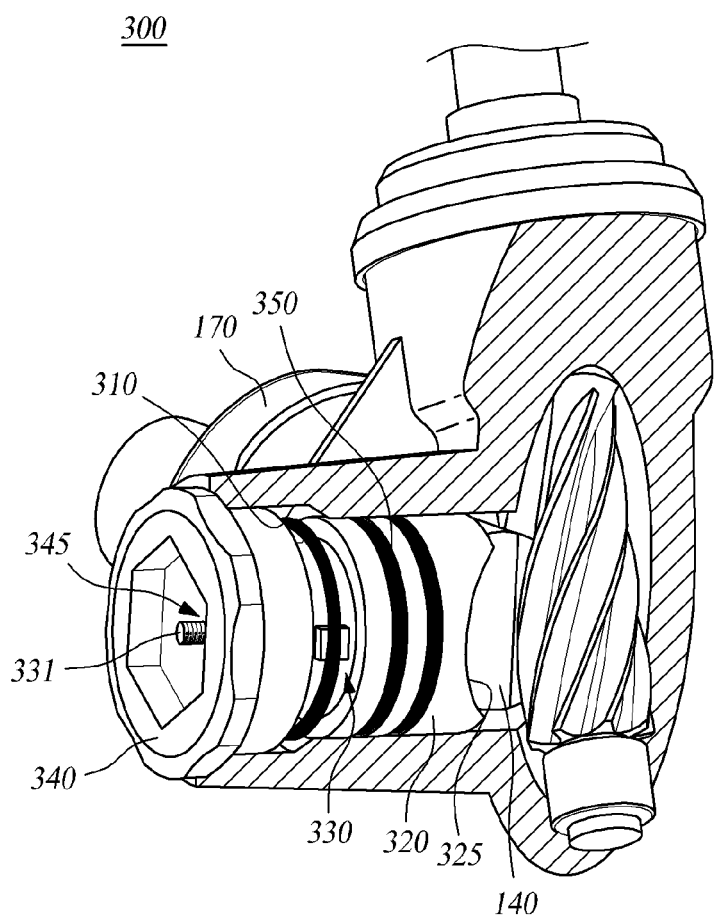
FIG. 3 is a perspective view illustrating an automatic clearance compensation device for a support yoke of a rack-pinion type steering apparatus in accordance with the present invention.
Figure 4:
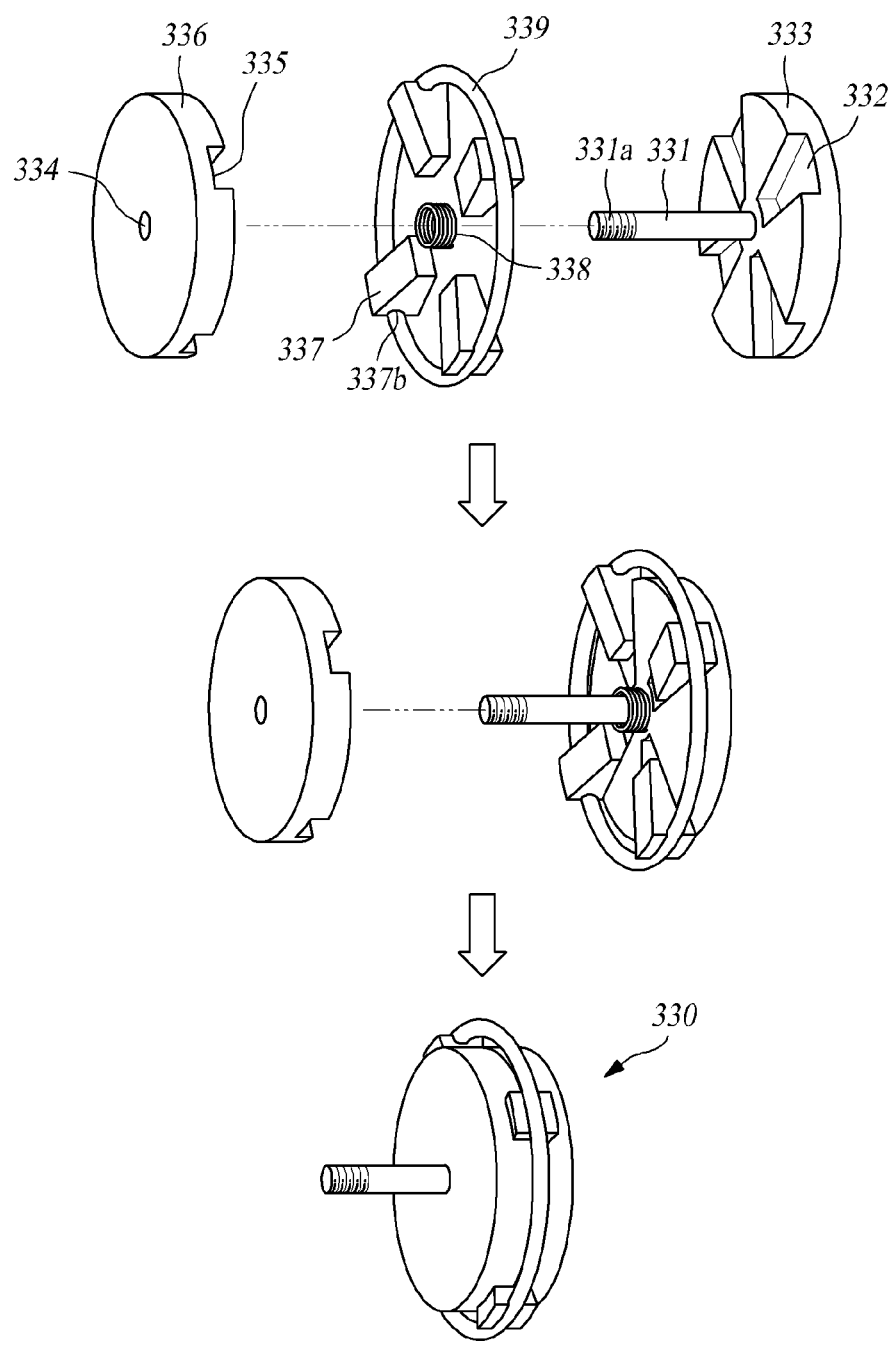
FIG. 4 is an exploded view and an assembled view of a spacer assembly shown in FIG. 3.

FIG. 3 is a perspective view illustrating an automatic clearance compensation device for a support yoke of a rack-pinion type steering apparatus in accordance with the present invention, and FIG. 4 is an exploded view and an assembled view of a spacer assembly shown in FIG. 3.

Referring to FIGS. 3 and 4, an automatic clearance compensation device 300 for a support yoke of a rack-pinion type steering apparatus in accordance with the present invention includes a hollow yoke cylinder 310 integrally formed with a rack housing 170, wherein the yoke cylinder 310 is positioned at the opposite side of a rack gear 110 (see FIG. 1) formed at a rack bar 140; a support yoke 320 slidably inserted within the yoke cylinder 310 and formed with a semi-circular groove 325 at its one side to be in close contact with the outer surface of the rack bar 140; a spacer assembly 330 installed within the yoke cylinder 310, contacting the other side of the support yoke 320 for pushing the support yoke 320 towards the rack bar 140, wherein the spacer assembly is expandable and retractable in axial and radial directions; and a yoke plug 340 coupled with a screw at the end of the yoke cylinder 310 for supporting the spacer assembly 330 and formed with an insert hole 345 through which a protrusion 331 of the spacer assembly 330 passes.

The support yoke 320 is designed in such a manner that a groove 325 formed at its front portion (the opposite side of the yoke plug 340 in the drawings) supports the rear surface of the rack bar 140. A yoke sheet (not shown) formed in a thin sheet may be disposed between the groove 325 of the support yoke 320 and the rack bar 140 so that the support yoke 320 is elastically in contact with the rack bar 140, which can guide the axial movement of the rack bar 140 and simultaneously prevent the groove 325 of the support yoke 320 from wearing.

In addition, at least one O-ring 350 can be further provided on the outer surface of the support yoke 320 to prevent introduction of foreign substances and noise due to collision of the adjacent components.

The spacer assembly 330 is disposed at the rear side of the support yoke 320, pushing the support yoke 320 with a predetermined pressure. Hence, the support yoke 320 enables the rack bar 140 to be closely in contact with the pinion shaft 220, which makes it possible to deliver the power with efficiency.

As shown in FIG. 4 in detail, the spacer assembly 330 includes a first spacer 333 provided with a slim and long protrusion 331 extending at a right angle from a center of one side surface thereof and two or more guide grooves 332 which are radially obliquely formed with respect to the protrusion 331; a second spacer 336 provided with a penetration hole 334 formed at the center of one side surface thereof and two or more guide grooves 335 which are radially obliquely formed with respect to the penetration hole 334; two or more wedge members 337 disposed between the guide grooves 332 and 335 forming pairs when the respective guide grooves 332 and 335 of the first and second spacers 333 and 336 are correspondingly positioned facing each other to form pairs; at least one axial elastic member 338 disposed in an axial direction between the first and second spacers 333 and 336; and a radial elastic member 339 for enclosing and connecting the radial outer surfaces of the wedge members 337 when the wedge members 337 are radially disposed between the first and second spacers 333 and 336.

The first and second spacers 333 and 336 are substantially plate-shaped members, and the guide grooves 332 and 335 obliquely formed on their facing surfaces are disposed in a symmetrical and equidistant manner. These spacers may be formed in plastic, metal or the like, preferably in steel for durability. Each of the respective guide grooves 332 and 335 radially extends from the center of each spacer, which is obliquely formed to change its depth.

The first spacer 333 is provided with a protrusion 331 extending at a right angle from a center of its one side surface on which the guide groove 332 is formed. The protrusion 331 passes through the penetration hole 334 of the second spacer 336 and enters the insert hole 345 of the yoke plug 340. In addition, the protrusion 331 is formed with a screw portion 331a on the outer surface of its end, with which a nut (not shown) is temporarily coupled when the steering apparatus is assembled. The opposite side of a surface having the guide groove 332 in the first spacer 333 is brought into contact with the support yoke 320 to support the same.

The second spacer 336 is provided with a penetration hole 334 which is formed at the center of a surface having the guide groove 335. As described in the above, the protrusion 331 of the first spacer 333 passes through the penetration hole 334 and then penetrates into the yoke plug 340. The opposite side of a surface having the guide groove 335 in the second spacer 336 is brought into a surface contact with the yoke plug 340 to be supported by the latter.

Each wedge member 337 is disposed between the guide grooves 332 and 335 forming pairs when the first and second spacers 333 and 336 are positioned facing each other. The wedge member may be formed from plastic, metal or the like, whose shape and size may be determined depending upon the shape and dimension of the guide grooves 332 and 335. Preferably, each wedge member 337 may be formed with an engaging groove 337b on which the radial elastic member 339 enclosing the radial outer surface of the wedge member 337 is mounted when the wedge member 337 is radially disposed between the first and second spacers 333 and 336.

At least one axial elastic member 338 is disposed in an axial direction between the first and second spacers 333 and 336. Preferably, the axial elastic member 338 includes a coil spring and inserted around the protrusion 331 of the first spacer 333. At this point, the outer diameter of the axial elastic member 338 should be larger than the inner diameter of the penetration hole 334 formed in the second spacer 336. Alternatively, a plurality of axial elastic members 338 may be arranged between the grooves 332 in the first spacer 333 or between the grooves 335 in the second spacer 336, respectively.

The radial elastic member 339 is a ring-shaped member of an elastic material, whose cross-section may be a circular or polygonal shape. This radial elastic member 339, as described hereinabove, is mounted in the engaging groove 339 formed on the radial outer side surface of the wedge members 337, so as to apply a resilient force to the wedge members 337 to be converged towards the center of the first spacer 333.

The yoke plug 340 is formed with a male screw portion on its outer surface, which is engaged with a female screw portion of the yoke cylinder 310. A tooling groove (not shown) is formed on the rear surface of the yoke plug 340, so that the yoke plug 340 can be fastened with the yoke cylinder 310 using a separate tool (not shown). Besides, the yoke plug 340 is formed with an insert hole 345 at its center, such that the protrusion 331 of the first spacer 333 is penetrated therethrough and then slidably movable.

Hereinafter, a method of assembling an automatic clearance compensation device 300 for a support yoke of a rack-pinion type steering apparatus in accordance with the present invention will be described.

First, a support yoke 320 is inserted into a hollow yoke cylinder 310 which is integrally formed with a rack housing 170. The support yoke 320 is inserted from the end side formed with a female screw portion of the yoke cylinder 310 and positioned to support the rear surface of the rack bar 140. At this moment, a yoke sheet (not shown) can be installed in the groove 325 of the support yoke 320, while at least one O-ring 350 can be installed on the outer surface of the support yoke 320.

Then, a spacer assembly 330 is assembled. In other words, an axial elastic member 338 is inserted around a protrusion 331 of a first spacer 333, and a wedge member 337 is disposed in each guide groove 332. In this state, the protrusion 331 of the first spacer 333 passes through a penetration hole 334 of a second spacer 336, thereby joining the second spacer 336 with the first spacer 333. Here, the guide grooves 335 of the second spacer 336 are aligned facing each other to make pairs with the guide grooves 332 of the first spacer 333.

Next, a radial elastic member 339 is mounted on each engaging groove 337b of the wedge members 337 which are radially disposed between the first spacer 333 and the second spacer 336 to connect the wedge members 337.

The protrusion 331 of the spacer assembly 330 which is assembled as such is inserted through an insert hole 345 of a yoke plug 340. The screw portion 331a formed on the outer surface of the distal end of the protrusion 331 being penetrated into the insert hole 345 is fastened by a nut (not shown), which constructs a temporary unit of the spacer assembly 330 and the yoke plug 340.

And then, the temporary unit of the spacer assembly 330 and the yoke plug 340 is inserted into a yoke cylinder 310, while the spacer assembly 330 is heading inwards, and the yoke plug 340 is fastened with the yoke cylinder 310 using a separate tool (not shown).

Finally, by releasing the nut temporarily fastened for the temporary unit of the spacer assembly 330 and the yoke plug 340, the spacer assembly 330 is installed between the support yoke 320 and the yoke plug 340.

Operation of an automatic clearance compensation device 300 for a support yoke of a rack-pinion type steering apparatus in accordance with the present invention will be illustrated hereinafter.

As shown in FIG. 3, since the space assembly 330 gives a force to the yoke plug 340 and the support yoke 320 while receiving a force from them in a reverse direction, the respective components are initially in close contact with each other to leave no clearance therebetween. Hence, no noise is generated due to the external impacts reversely inputted to the rack bar 140.

After long-term use of the steering apparatus, the groove 325 formed at the front portion of the support yoke 320 is gradually worn out to create a clearance therebetween. Hence, the first spacer 333 pushes the support yoke 320 towards the rack bar 140 through the resilient force of the axial elastic member 338. At the same time, the first spacer 333 is separated from the second spacer 336, such that each wedge member 337 is converged along the guide grooves 332 and 335 towards the center of the first spacer 333 by the resilient force of the radial elastic member 339.

Consequently, it can be noted that when wear is occurred due to a long-term use, the wedge members 337 are converged along the guide grooves 332 and 335 of the first and second spacers 333 and 336 towards the center of the first spacer 333 by the resilient force of the radial elastic member 339 to create an operational force in an axial direction, so that the support yoke 320 pushes the rack bar 140 with a constant force to automatically compensate for the clearance created therebetween.

According to the present invention having constructions and shapes as the above, it has advantages in that the clearance created due to the wear between the rack bar and the support yoke can be automatically compensated, and at the same time the noise generated between the support yoke and the yoke plug even through the reverse input of the external impacts via the rack bar can be eliminated.

Even if it was described above that all of the components of an embodiment of the present invention are coupled as a single unit or coupled to be operated as a single unit, the present invention is not necessarily limited to such an embodiment. That is, among the components, one or more components may be selectively coupled to be operated as one or more units.

In addition, since terms, such as "including," "comprising," and "having" mean that one or more corresponding components may exist unless they are specifically described to the contrary, it shall be construed that one or more other components can be included. All of the terms containing one or more technical or scientific terminologies have the same meanings that persons skilled in the art understand ordinarily unless they are not defined otherwise. A term ordinarily used like that defined by a dictionary shall be construed that it has a meaning equal to that in the context of a related description, and shall not be construed in an ideal or excessively formal meaning unless it is clearly defined in the present specification.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

What is claimed is:

1. An automatic clearance compensation device for a support yoke of a rack-pinion type steering apparatus, comprising:
    a hollow yoke cylinder integrally formed with a rack housing, wherein the yoke cylinder is positioned at the opposite side of a rack gear formed at a rack bar;
    a support yoke slidably inserted within the yoke cylinder and formed with a groove at its one side to be in contact with the outer surface of the rack bar;
    a spacer assembly installed within the yoke cylinder, contacting the other side of the support yoke, wherein the spacer assembly is expandable and retractable in axial and radial directions; and
    a yoke plug coupled at the end of the yoke cylinder for supporting the spacer assembly,
    wherein the spacer assembly comprises:
    a first spacer provided with a first set of guide grooves;
    a second spacer provided with a second set of guide grooves; and
    two or more wedge members disposed between the first and second spacers and opposite sides thereof being inserted into the first and second set of guide grooves which are correspondingly positioned facing each other to form pairs.

2. The automatic clearance compensation device as recited in claim 1, wherein the spacer assembly comprises:
    at least one axial elastic member disposed in an axial direction between the first and second spacers; and
    a radial elastic member for enclosing and connecting the radial outer surfaces of the wedge members when the wedge members are radially disposed between the first and second spacers,
    wherein the first spacer is provided with a protrusion extending at a right angle from a center of its one side surface and the first set of guide grooves are radially obliquely formed with respect to the protrusion,
    the second spacer is provided with a penetration hole formed at the center of its one side surface through which the protrusion is penetrated and the second set of guide grooves are radially obliquely formed with respect to the penetration hole,
    the spacer assembly is disposed within the yoke cylinder so that the protrusion extends towards the opposite side of the support yoke, and
    the yoke plug is formed with an insert hole through which the protrusion of the spacer assembly is penetrated.

3. The automatic clearance compensation device as recited in claim 2, wherein the protrusion is formed with a screw portion on the outer surface of its end, and the screw portion of the protrusion passing through the yoke plug is temporarily fastened with a nut when being assembled.

4. The automatic clearance compensation device as recited in claim 2, wherein the wedge member is formed with an engaging groove on which the radial elastic member for enclosing the radial outer surface of the wedge member is mounted.

5. The automatic clearance compensation device as recited in claim 2, wherein the axial elastic member comprises a coil spring.

6. The automatic clearance compensation device as recited in claim 2, wherein the axial elastic member is inserted around the protrusion of the first spacer.

7. The automatic clearance compensation device as recited in claim 2, wherein the radial elastic member is a ring-shaped member of an elastic material.

8. The automatic clearance compensation device as recited in claim 1, wherein at least one O-ring is provided on the outer surface of the support yoke.

* * * * *